US012636795B2

(12) United States Patent
Namiki

(10) Patent No.: US 12,636,795 B2
(45) **Date of Patent: *May 26, 2026**

(54) CONTROL DEVICE

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 107 days.

This patent is subject to a terminal disclaimer.

(21) Appl. No.: 18/699,302

(22) PCT Filed: Oct. 18, 2021

(86) PCT No.: PCT/JP2021/038474
§ 371 (c)(1),
(2) Date: Apr. 8, 2024

(87) PCT Pub. No.: WO2023/067659
PCT Pub. Date: Apr. 27, 2023

(65) Prior Publication Data
US 2024/0391108 A1      Nov. 28, 2024

(51) Int. Cl.
*B25J 9/16* (2006.01)
*G05B 19/4155* (2006.01)
*H04N 23/695* (2023.01)

(52) U.S. Cl.
CPC ............. *B25J 9/1697* (2013.01); *B25J 9/163* (2013.01); *G05B 19/4155* (2013.01); *H04N*

*23/695* (2023.01); *G05B 2219/31449* (2013.01); *G05B 2219/50391* (2013.01)

(58) Field of Classification Search
None
See application file for complete search history.

(56) References Cited

U.S. PATENT DOCUMENTS

| | | | | |
|---|---|---|---|---|
| 5,987,591 | A * | 11/1999 | Jyumonji ............... | B25J 9/1697 700/259 |
| 9,919,427 | B1 * | 3/2018 | Guilbert ................. | B25J 9/1664 |
| 2003/0216834 | A1 * | 11/2003 | Allard .................... | B25J 9/1689 700/245 |
| 2004/0017470 | A1 * | 1/2004 | Hama .................. | H04N 23/695 348/E7.086 |
| 2004/0243282 | A1 * | 12/2004 | Watanabe ............. | G06T 1/0014 700/259 |

(Continued)

FOREIGN PATENT DOCUMENTS

| | | |
|---|---|---|
| JP | H09297611 A | 11/1997 |
| JP | H10-187221 A | 7/1998 |

(Continued)

*Primary Examiner* — Ryan Rink
(74) *Attorney, Agent, or Firm* — HAUPTMAN HAM, LLP

(57) ABSTRACT

A control device for controlling an industrial machine, the control device comprising: an image operating unit that displays an image captured by a visual sensor on a display screen, and accepts a user operation with respect to the image; and a motion control unit that controls a motion of the industrial machine so as to move a visual field of the visual sensor displayed as an image on the display screen, in accordance with the accepted user operation.

10 Claims, 7 Drawing Sheets

(56) References Cited

U.S. PATENT DOCUMENTS

| | | | | |
|---|---|---|---|---|
| 2006/0229766 | A1* | 10/2006 | Setsuda | G05B 19/425 700/245 |
| 2009/0234502 | A1* | 9/2009 | Ueyama | G05B 19/401 700/259 |
| 2012/0166165 | A1* | 6/2012 | Nogami | B25J 9/1671 703/6 |
| 2015/0039127 | A1* | 2/2015 | Matsumoto | G08C 23/04 700/253 |
| 2015/0190925 | A1* | 7/2015 | Hoffman | B25J 9/161 901/47 |
| 2016/0031089 | A1* | 2/2016 | One | B25J 9/06 700/264 |
| 2016/0203799 | A1* | 7/2016 | Sonoda | B25J 9/1697 901/47 |
| 2018/0024521 | A1* | 1/2018 | Matsuura | B25J 9/1692 700/83 |
| 2018/0178388 | A1* | 6/2018 | Ishige | B25J 9/1692 |
| 2018/0304467 | A1* | 10/2018 | Matsuura | B25J 13/06 |
| 2020/0361092 | A1* | 11/2020 | Zhong | B25J 9/1697 |
| 2025/0121496 | A1* | 4/2025 | Jinandra | B25J 9/1697 |

FOREIGN PATENT DOCUMENTS

| | | | |
|---|---|---|---|
| JP | 2004-017223 | A | 1/2004 |
| JP | 2004-351570 | A | 12/2004 |
| JP | 2005-201824 | A | 7/2005 |
| JP | 2006-139525 | A | 6/2006 |
| JP | 2006-289531 | A | 10/2006 |
| JP | 3925299 | B2 | 6/2007 |
| JP | 2008-221428 | A | 9/2008 |
| JP | 2012-135821 | A | 7/2012 |
| JP | 2017-221991 | A | 12/2017 |
| JP | 2018-017654 | A | 2/2018 |
| JP | 6576042 | B2 | 9/2019 |
| JP | 2020-011334 | A | 1/2020 |
| JP | 2020-078859 | A | 5/2020 |
| JP | 2021-115693 | A | 8/2021 |

* cited by examiner

CONTROL DEVICE

RELATED APPLICATIONS

The present application is a National Phase of International Application No. PCT/JP2021/038474 filed Oct. 18, 2021.

FIELD

The present invention relates to a control device of an industrial machine.

BACKGROUND

A robot system configured to detect a workpiece by a visual sensor attached to a hand of a robot and perform predetermined work such as picking-up of a detected workpiece has been known. When such a robot system is constructed, teaching of a robot using a teach pendant is performed.

An example of a robot system using a function by a visual sensor is described in PTLs 1 to 4.

It should be noted that, with regard to a robot control system, PTL 5 describes that the "robot state notification unit 323 notifies the control server 40 about information about the robot, for example, information about an ID number assigned to each service execution robot 30 when a plurality of the service execution robots 30 are used, a type of the robot, a current position of the service execution robot 30, a current state of the service execution robot 30 such as a standby state, a state during movement by a robot dispatch command, and a state during use by a user, and remaining battery life" (paragraph 0040).

With regard to a robot teaching system, PTL 6 describes that "during jog feed motion, an operator can switch a motion mode (free jog feed mode) in which a movement range of the robot 100 is not limited to a predetermined range to a motion mode (limited jog feed mode) in which the movement range of the robot 100 is limited to the predetermined range" (paragraph 0042).

PTL 7 describes that a "robot controller 2 that controls a robot 1 includes: a teach pendant approach detection device 7 installed outside a motion range of the robot 1; a detected device 8 that is located on a teach pendant 3 and can be detected by the teach pendant approach detection device 7; and an operation unit 31 located on the teach pendant 3. Only when the teach pendant approach detection device 7 detects the teach pendant 3, a motion mode of a robot can be selected from the teach pendant 3" (abstract).

CITATION LIST

Patent Literature

[PTL 1] Japanese Unexamined Patent Publication (Kokai) No. 2004-351570 A

[PTL 2] Japanese Unexamined Patent Publication (Kokai) No. 2020-078859 A

[PTL 3] Japanese Unexamined Patent Publication (Kokai) No. 2005-201824 A

[PTL 4] Japanese Unexamined Patent Publication (Kokai) No. 2006-139525 A

[PTL 5] Japanese Unexamined Patent Publication (Kokai) No. 2017-221991 A

[PTL 6] Japanese Unexamined Patent Publication (Kokai) No. 2008-221428 A

[PTL 7] Japanese Unexamined Patent Publication (Kokai) No. 2004-017223 A

SUMMARY

Technical Problem

In a robot system using a visual sensor, an operator performs many operations of bringing a workpiece into a visual field of the visual sensor by performing a jog operation on a robot while the operator views an image of the visual sensor when the operator teaches operations to the robot. In this case, an orientation of a region including the workpiece viewed from the operator and an orientation of the workpiece captured in the image may be different. In such a situation, it is difficult for the operator to intuitively understand how the workpiece is moved in the image with respect to a direction in which the robot is operated by the jog operation. As a result, considerable time and effort is required in order for the operator to operate the robot such that the workpiece falls within the visual field of the visual sensor.

Solution to Problem

One aspect of the present disclosure is a control device for controlling an industrial machine. The control device includes: an image operation unit configured to display an image captured by a visual sensor on a display screen, and also receives a user operation on the image; and a motion control unit configured to control motion of the industrial machine so that a visual field of the visual sensor being captured as the image on the display screen is moved in response to the received user operation.

Advantageous Effects of Invention

According to the configurations described above, an operation of a robot by an operation on an image can be achieved, and an intuitive operation of the robot can be achieved.

The objects, the features, and the advantages, and other objects, features, and advantages will become more apparent from the detailed description of typical embodiments of the present invention illustrated in the accompanying drawings.

DESCRIPTION OF EMBODIMENTS

Figure 1:
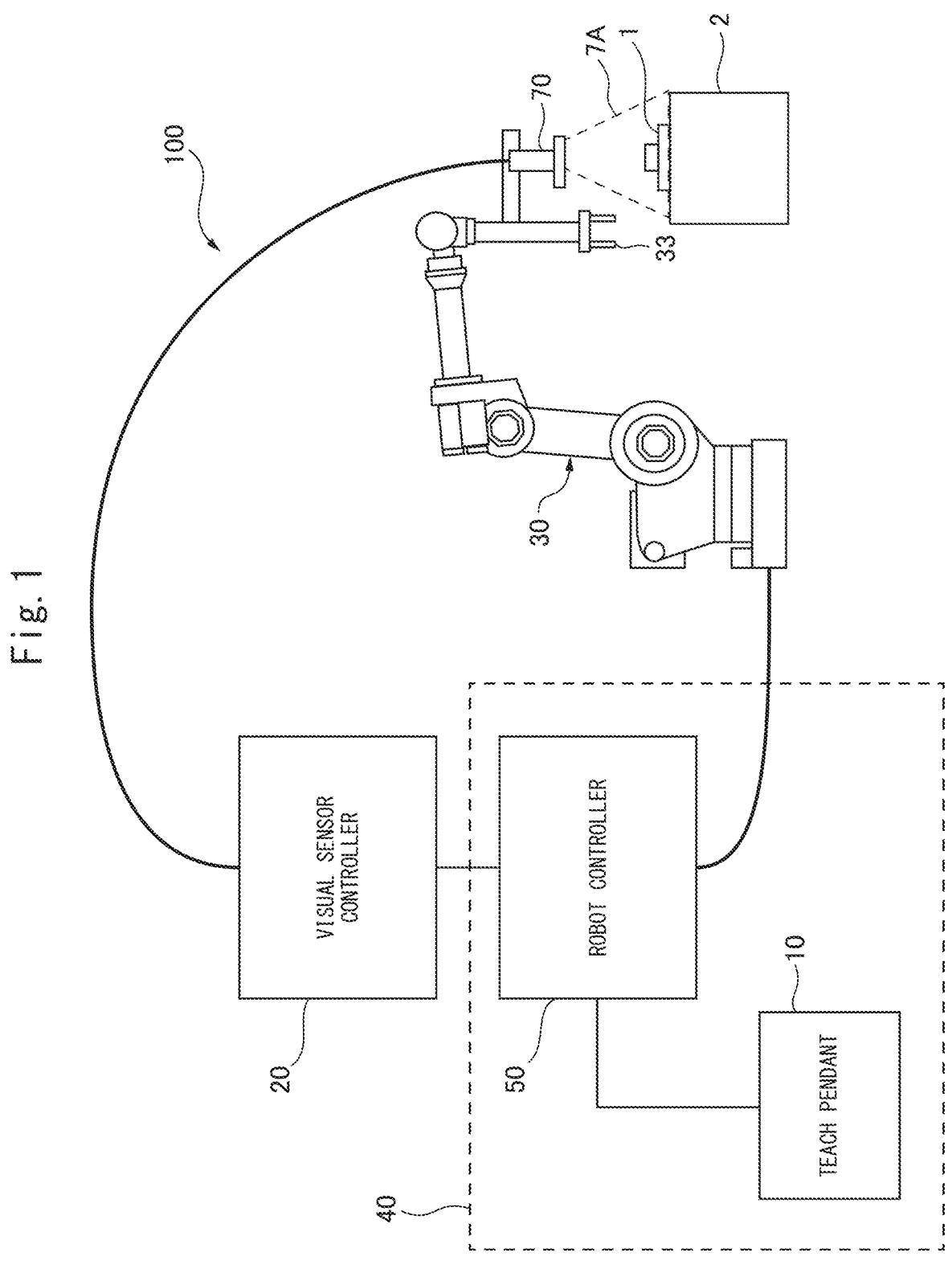
FIG. 1 is a diagram illustrating an overall configuration of a robot system according to one embodiment.

Next, embodiments of the present disclosure will be described with reference to the drawings. A similar configuration portion or a similar functional portion is denoted by the same reference sign in the referred drawings, and scale is appropriately changed in the drawings in order to facilitate understanding. Further, an aspect illustrated in the drawing is one example for implementing the present invention, which is not limited to the illustrated aspect.

FIG. 1 is a diagram illustrating an overall configuration of a robot system 100 according to one embodiment. The robot system 100 includes a robot 30 including a hand (grasping device) 33 mounted on an arm tip portion, a robot controller 50 that controls the robot 30, a teach pendant 10 connected to the robot controller 50, a visual sensor 70 attached to the arm tip portion of the robot 30, and a visual sensor controller 20 that controls the visual sensor 70. The visual sensor controller 20 is connected to the robot controller 50. The robot system 100 can detect a target object 1 (hereinafter described as a workpiece) on a worktable 2 by the visual sensor 70, and perform handling of the workpiece 1 with the hand 33 mounted on the robot 30. It should be noted that FIG. 1 illustrates a visual field 7A of the visual sensor 70 that captures the workpiece 1.

The robot 30 as an industrial machine is assumed to be a vertical articulated robot herein, but a robot of another type may be used. The robot controller 50 controls motion of the robot 30 according to a motion program loaded in the robot controller 50 or a command input from the teach pendant 10. It should be noted that, as illustrated in FIG. 1, the entire function included in the robot controller 50 and the teach pendant 10 may be defined as a control device 40 of the industrial machine.

The visual sensor controller 20 has a function of controlling the visual sensor 70 and a function of performing image processing on an image captured by the visual sensor 70. The visual sensor controller 20 detects a position of the workpiece 1 from the image captured by the visual sensor 70, and provides the detected position of the workpiece 1 to the robot controller 50. In this way, the robot controller 50 can correct a teaching position, and perform picking-up and the like of the workpiece 1. The visual sensor 70 may be a camera that captures a gray-scale image and a color image, or may be a stereo camera or a three-dimensional sensor that can acquire a distance image and a three-dimensional point group. The visual sensor controller 20 holds a model pattern of a workpiece, and can perform image processing of detecting a workpiece by pattern matching between an image of the workpiece in a captured image and the model pattern.

In the present embodiment, it is assumed that calibration has been performed on the visual sensor 70, and it is assumed that the visual sensor controller 20 possesses calibration data that define a relative positional relationship between the visual sensor 70 and the robot 30. In this way, a position on an image captured by the visual sensor 70 can be converted to a position on a coordinate system (such as a robot coordinate system) fixed in a workspace.

It should be noted that, in FIG. 1, the visual sensor controller 20 is formed as a device separately from the robot controller 50, but a function as the visual sensor controller 20 may be embedded in the robot controller 50.

Figure 2:
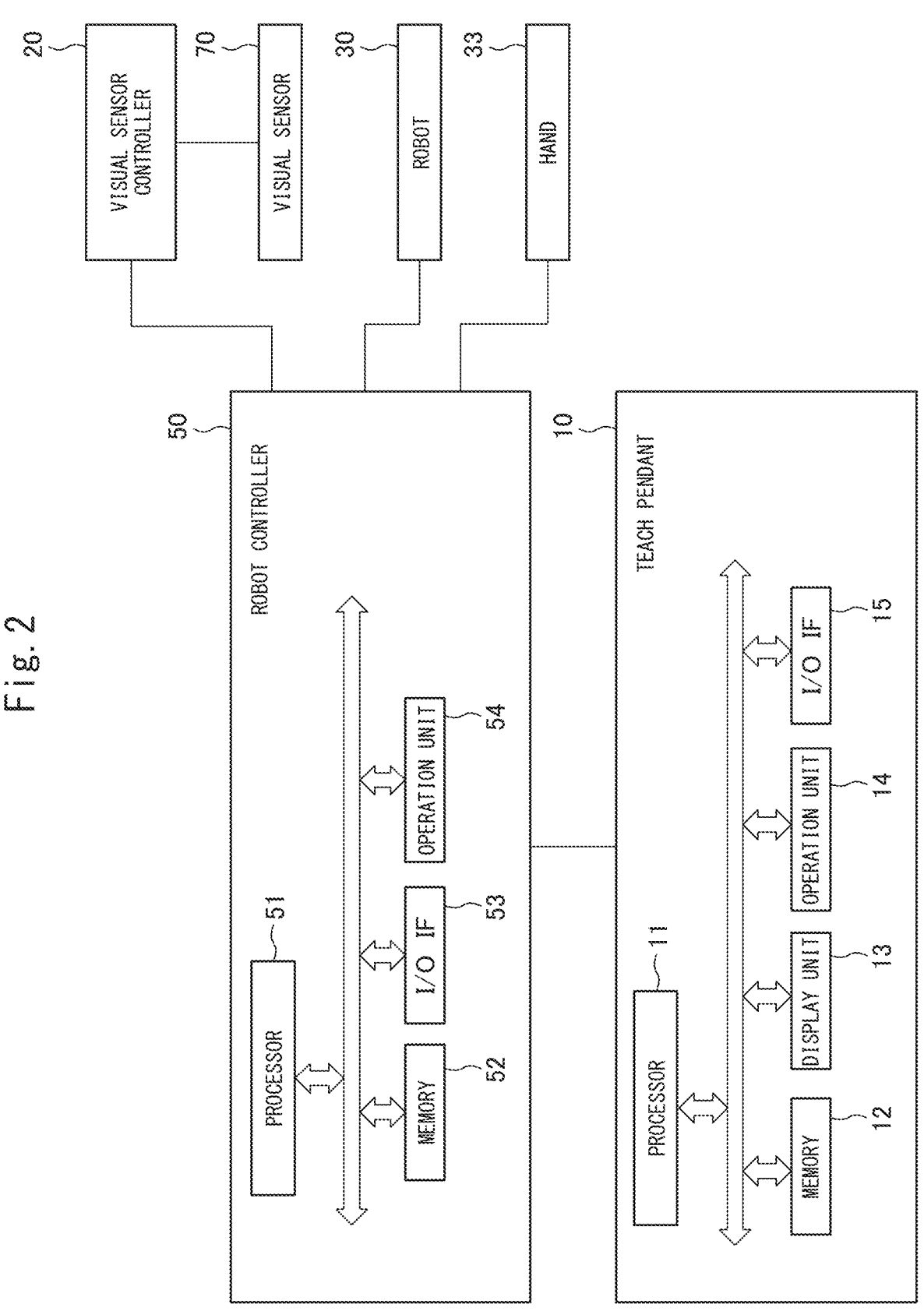
FIG. 2 is a diagram illustrating a hardware configuration example of a robot controller and a teach pendant.

FIG. 2 is a diagram illustrating a hardware configuration example of the robot controller 50 and the teach pendant 10. The robot controller 50 may have a configuration as a general computer in which a memory 52 (such as a ROM, a RAM, and a non-volatile memory), an input/output interface 53, an operation unit 54 including various operation switches, and the like are connected to a processor 51 via a bus. The teach pendant 10 is used as a device for performing an operation input and a screen display for teaching operations to the robot 30 (i.e., creating a control program). The teach pendant 10 may have a configuration as a general computer in which a memory 12 (such as a ROM, a RAM, and a non-volatile memory), a display unit 13, an operation unit 14 formed of an input device such as a keyboard and a touch panel (software key), an input/output interface 15, and the like are connected to a processor 11 via a bus. It should be noted that various information processing devices such as a tablet terminal, a smartphone, and a personal computer can be used as a teaching device instead of the teach pendant 10.

Further, the visual sensor controller 20 may also have a configuration as a general computer in which a memory (such as a ROM, a RAM, and a non-volatile memory), an input/output interface, a display unit, an operation unit, and the like are connected to a processor via a bus.

Figure 3:
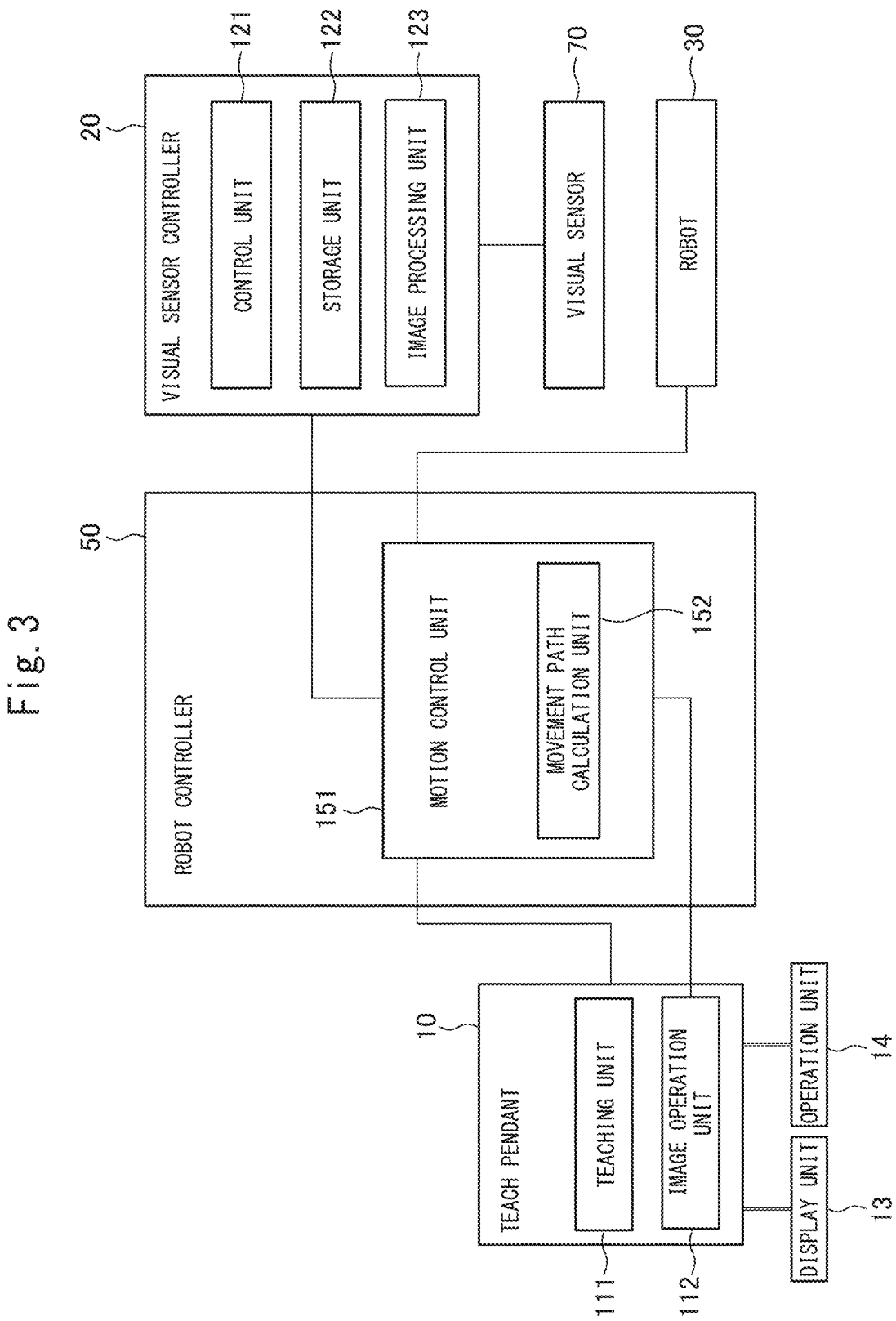
FIG. 3 is a functional block diagram illustrating a functional configuration of the teach pendant, the robot controller, and a visual sensor controller.

FIG. 3 is a functional block diagram illustrating a functional configuration of the teach pendant 10, the robot controller 50, and the visual sensor controller 20.

As illustrated in FIG. 3, the teach pendant 10 includes a teaching unit 111 and an image operation unit 112. The teaching unit 111 has a function as an interface that provides various pieces of information for teaching operations to the robot 30 and also receives a teaching input via a key operation such as a jog operation. The image operation unit 112 has a function as a user interface that displays a captured image of the visual sensor 70 acquired via the robot controller 50 on the display unit 13, and also receives a user operation on an image (i.e., a display screen configured as a touch panel).

The robot controller 50 includes a motion control unit 151 that controls motion of the robot 30 according to a motion program or a command from the teach pendant. The motion control unit 151 includes a movement path calculation unit 152 that calculates a movement path for moving the robot 30 in response to a user operation on an image being input via the image operation unit 112.

The teach pendant 10 includes an operation mode (hereinafter also described as an image operation mode) of operating the robot 30 by an operation on an image in addition to a normal operation mode of performing an operation (such as a jog operation) of the robot 30 with reference to a direction viewed from the robot 30. In the image operation mode, the movement path calculation unit 152 calculates a movement path for moving the robot 30, based on information indicating a user operation being input via the image operation unit 112. The motion control unit 151 moves the robot 30 (tool center point (TCP)) according to the calculated movement path.

Switching between the normal operation mode and the image operation mode may be performed by performing a predetermined operation on the operation unit 14 by an operator. Specifically, a switching button for switching between the normal operation mode and the image operation mode may be disposed on an image. Alternatively, switching from the normal operation mode to the image operation mode may be automatically performed in conjunction with activation of an adjustment screen for adjusting a parameter of a processing program of the visual sensor 70.

The visual sensor controller 20 includes a control unit 121, a storage unit 122, and an image processing unit 123. The control unit 121 comprehensively performs control on the visual sensor 70 and control on the image processing unit 123 and the storage unit 122 in response to a command from the motion control unit 151. The storage unit 122 stores various pieces of data (such as a model pattern) needed to perform image processing, and calibration data. The calibration data include a relative positional relationship of a coordinate system set for the visual sensor 70 with respect to a coordinate system set for the robot 30. The calibration data may further include an internal parameter (such as a focal distance, an image size, and lens distortion) related to a capturing optical system. The image processing unit 123 has a function of performing pattern matching and various other types of image processing.

A scenario where the robot 30 is taught for handling the workpiece 1 is considered. In this case, in general, an operator moves the robot 30 (hand 33) to a desired position by performing an operation (jog operation) on the teach pendant 10 while making a confirmation of an image captured on a display screen of the teach pendant 10 and a confirmation by visual observation. An image displayed on the display screen of the teach pendant 10 is an image (i.e., an image acquired from a perspective of a robot) with reference to the robot 30, and thus an orientation of a workpiece captured on the display screen and an orientation of the workpiece viewed from the operator may be different. In this case, it is difficult for the operator to intuitively recognize how the workpiece is moved within the display screen with respect to a direction in which an operation (jog operation) is performed on the robot 30. In the present embodiment, by adopting a configuration in which a user operation on an image is received and a robot is controlled so that a region captured in a visual field of a visual sensor is moved in response to the user operation, an intuitive robot operation via the image can be achieved.

Hereinafter, examples of robot control by an operation on an image will be described with reference to FIG. 4 to FIG. 8. In these examples, the visual sensor 70 is assumed to be a camera that acquires a two-dimensional image, and an image acquired by the visual sensor 70 is assumed to be a two-dimensional image. The teach pendant 10 and the robot controller 50 are assumed to be set in the image operation mode.

Figure 4:
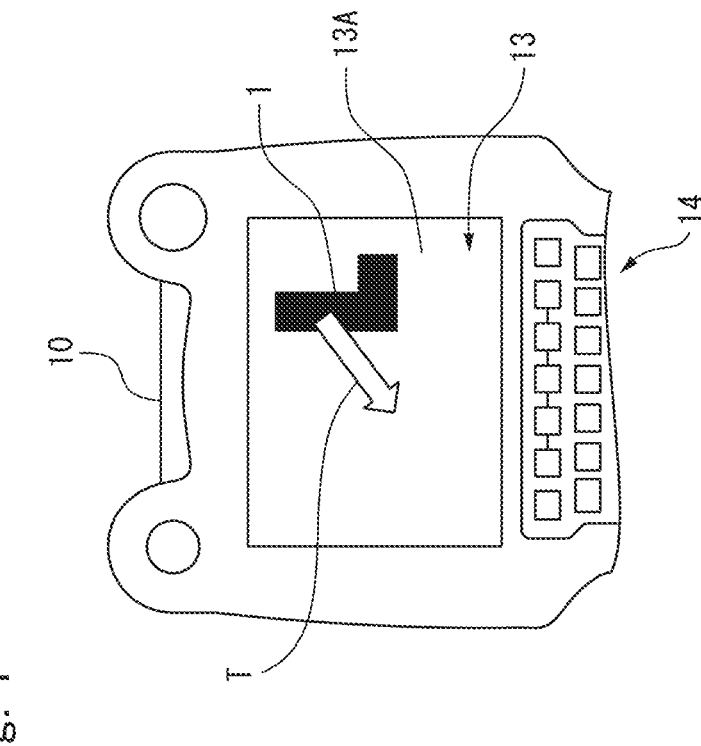
FIG. 4 is a diagram for describing, together with FIG. 5, a first example of a robot operation by an operation on an image.
Figure 5:
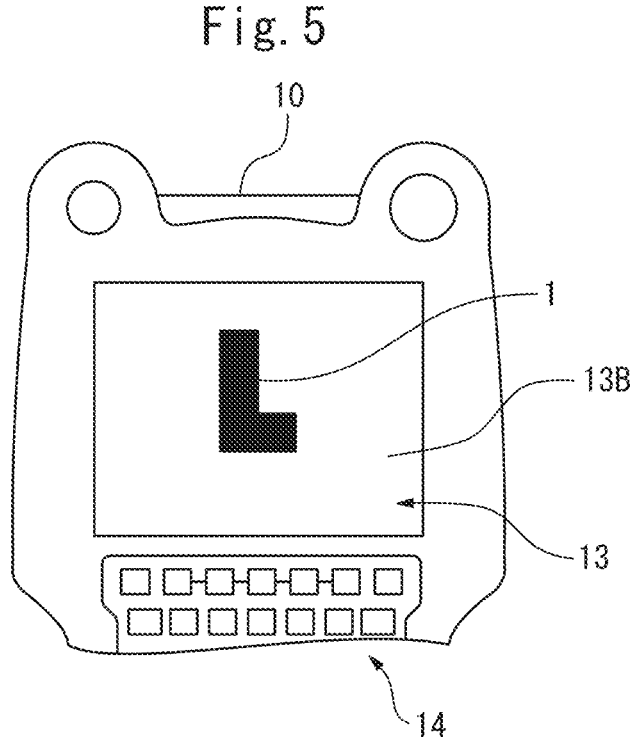
FIG. 5 is a diagram for describing, together with FIG. 4, the first example of the robot operation by an operation on an image.

A first example of a robot operation by an operation on an image will be described with reference to FIG. 4 and FIG. 5. FIG. 4 illustrates, on the right side, a state where an image 13A captured by the visual sensor 70 is displayed on a display screen of the display unit 13 of the teach pendant 10. As described above, the image 13A is an image (image from a perspective of a robot) with reference to a direction viewed from the robot 30. In the image 13A, the workpiece 1 is captured in an illustrated orientation. FIG. 4 illustrates, on the left side, an orientation of the workpiece 1 captured in a field of vision E of an operator. In this way, the orientation of the workpiece 1 captured on the image and the orientation of the workpiece 1 visually recognized by the operator are different.

On the image 13A, the operator can perform an operation (pan operation) for moving a visual field of the visual sensor 70. An example in which the operator performs an operation for designating a movement direction and a movement amount of the visual field of the visual sensor 70 by performing an operation for tracing the image 13A (display screen) with a finger is illustrated. The image operation unit 112 extracts a track on which the operator traces the display screen of the image 13A with a finger, and acquires a movement vector T indicating a movement direction and a movement amount being intended by the operator. It should be noted that, in the illustrated example, the operator intends to move the workpiece 1 to the center of the display screen.

In order to acquire the movement vector T, the image operation unit 112 may obtain a movement direction by approximating, by a straight line, a track when the operator traces the display screen. The image operation unit 112 provides information (the movement vector T herein) indicating the user operation acquired in such a manner to the movement path calculation unit 152 of the robot controller 50.

The movement path calculation unit 152 calculates a movement path (three-dimensional path information) of the robot 30 from the movement vector T designated on the image. As one example, the movement path calculation unit 152 may obtain a vector in a workspace corresponding to the movement vector T on the image by projecting a starting point and an end point of the movement vector T of the image 13A (capturing surface of a capturing element) onto a specific plane in the workspace including the robot 30, and set a movement path of the robot 30 from the vector. It should be noted that an operation direction (direction of the movement vector T) by a user operation on an image and a direction in which the robot 30 is moved are generally opposite directions. When such projection is performed, calibration data including a definition of a relative positional relationship between the visual sensor 70 and the robot 30 are used. The specific plane is, for example, a plane perpendicular to an optical axis of the visual sensor 70. In the present example, the specific plane may be a surface on which the workpiece 1 is mounted.

The movement path calculation unit 152 provides the movement path acquired in such a manner to the motion control unit 151. Then, the motion control unit 151 moves the robot 30 according to the movement path. By the motion described above, a region captured on the display screen of the teach pendant 10 is moved according to a user operation (movement vector T). By the motion described above, in a case of the present example, an image 13B in which the workpiece 1 is captured at the center of the display screen is acquired as illustrated in FIG. 5.

The example relating to obtaining a movement vector indicating a user operation is described above. However, as long as at least a movement direction corresponding to a user operation can be acquired, a visual field of the visual sensor can be moved in a direction intended by a user. In this case, the image operation unit 112 approximates, by a straight line, a track being traced by an operator with a finger, and acquires a movement direction intended by the operator on the image. In this way, the movement path calculation unit 152 can acquire a direction corresponding to the movement direction on the image and in which the robot 30 is moved. Also, in this case, a movement direction of the robot in a workspace corresponding to the movement direction on the image can be acquired by using an operation for projecting a position on the image indicating a user operation onto a specific plane in the workspace. A movement amount of the robot 30 may be appropriately determined so that a movement amount of a visual field of the visual sensor 70 is set to be a predetermined amount.

Further, control so that, while an operator performs an operation for touching and tracing the display screen, a visual field of the visual sensor 70 is moved along the tracing operation may be performed. As one example, this motion can be achieved by the following algorithm.

(a1) A starting point and an end point during an operation (during a pan operation) on an image are acquired at regular time intervals.

(a2) The acquired starting point and end point are projected onto a specific plane in a robot coordinate system.

(a3) A movement path of a robot is set from a vector connecting the starting point and the end point being projected onto the specific plane, and the robot 30 is controlled.

Figure 6:
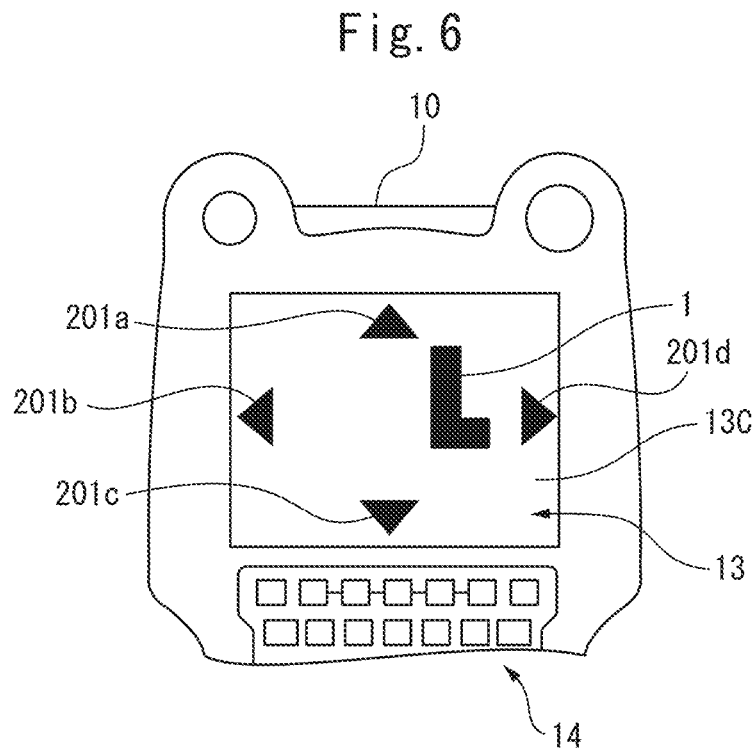
FIG. 6 is a diagram for describing a second example of a robot operation by an operation on an image.

Next, a second example of a robot operation by an operation on an image will be described with reference to FIG. 6. In the present example, the image operation unit 112 displays, on the display screen of the display unit 13 of the teach pendant 10, four arrow keys 201a, 201b, 201c, and 201d indicating upper, lower, left, and right directions as operation keys for moving a visual field of the visual sensor 70. When an operator touches any of the arrow keys 201a, 201b, 201c, and 201d, the visual field (region captured in the image) of the visual sensor 70 is moved in a direction indicated by the touched arrow. In this case, the image operation unit 112 provides information indicating the direction of the touched arrow key to the movement path calculation unit 152. The movement path calculation unit 152 obtains a movement direction of the robot 30 in a workspace corresponding to the direction of the touched arrow key.

With regard to a movement amount, for example, control so that, while the operator touches the arrow key, the visual field (region captured in the image) of the visual sensor 70 is moved at a fixed speed may be performed. Alternatively, with regard to each movement direction, control so that a movement amount increases with a larger arrow by disposing arrow keys in different sizes on the display screen may be performed.

The operator can bring the workpiece 1 captured on an image 13C to a desired position (for example, the center of the screen) by operating the arrow key.

Figure 7:
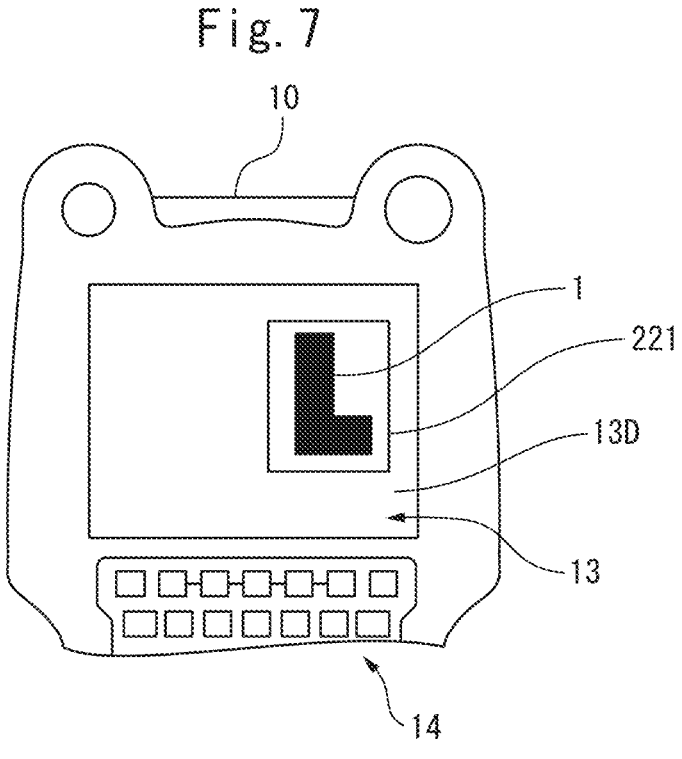
FIG. 7 is a diagram for describing, together with FIG. 8, a third example of a robot operation by an operation on an image.

Next, a third example of a robot operation by an operation on an image will be described with reference to FIG. 7 and FIG. 8. As illustrated in FIG. 7, in the present example, an operator designates, on an image 13D in which a visual field of the visual sensor 70 is captured, a region as a target desired to be moved on the screen. FIG. 7 illustrates an example of a case where a region 221 designated by the operator is a rectangle, but a region designated by the operator may have another shape (such as a circle). The robot controller 50 moves the robot 30 so that the center (geometric center) of the region 221 is located in a predetermined position of the display screen. In a different expression, the robot controller 50 moves the robot 30 so that the region 221 is moved to a predetermined region on the display screen. The center of the region 221 is assumed to be moved to the center of the display screen.

In this case, the image operation unit 112 obtains a movement vector from the center (geometric center) of the region 221 designated on the image 13D to the center of the image 13D, and provides the movement vector to the movement path calculation unit 152. The movement path calculation unit 152 can calculate a movement path of the robot 30 from the movement vector on the image by the technique by projection described above.

Figure 8:
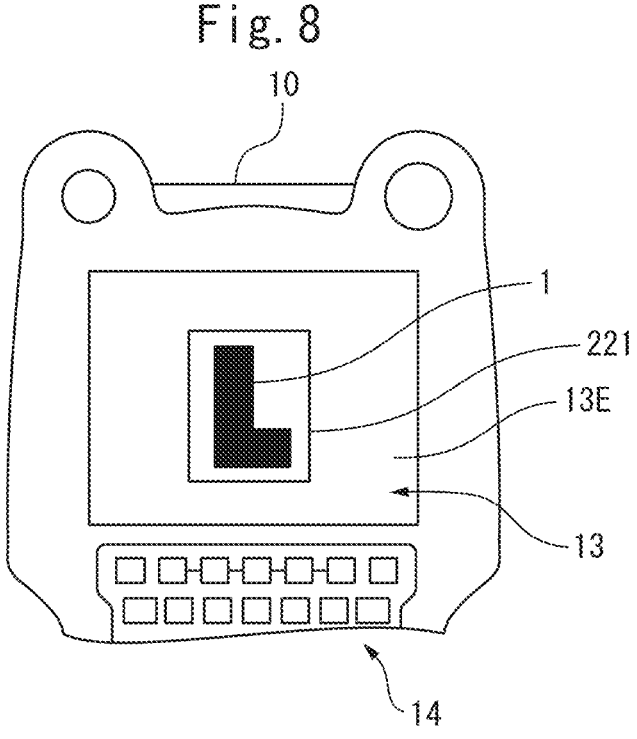
FIG. 8 is a diagram for describing, together with FIG. 7, the third example of the robot operation by an operation on an image.

FIG. 8 illustrates an image 13E in a state where the center of the region 221 is moved to the center of the display screen by the motion described above. In this way, in response to a user operation of designating a region on an image, the designated region is moved to a predetermined position of the display screen.

In the present example, there are various ways for designating the rectangle region 221. For example, an operator may make a rectangle by tracing the display screen, or an operator may designate two points on the screen and thus make a rectangle having the two points as diagonal positions appear. Alternatively, an operator may touch one point on the screen and thus make a rectangle having the one point as the geometric center appear. By designating a rectangular region, magnification of an image may be changed so that the region is displayed at maximum size. In this case, for example, the image operation unit 112 may make the center of the designated rectangular region coincide with the center of the display screen as illustrated in FIG. 8 by the motion described above, and then adjust the magnification of the image so that the rectangular region is maximized in size within the display screen.

A fourth example of a robot operation by an operation on an image will be described. A case where a plurality of workpieces are captured in an image displayed on the teach pendant 10, and the workpieces are detected by teaching shapes and the like of the workpieces in advance to the visual sensor controller 20 is assumed. In this case, an operator touches and designates a workpiece desired to be brought to a predetermined position (the center herein) of the display screen among the plurality of workpieces captured in the image. Since each of the workpieces is detected on the image, a position on the image of the workpiece designated by the operator is known in the teach pendant 10 or the robot controller 50. Therefore, the image operation unit 112 can acquire a movement vector on the image for moving the center of the workpiece designated by the operator to the center of the display screen. The movement path calculation unit 152 can acquire, based on the movement vector, a movement path of the robot 30 for moving the center of the workpiece designated by the operator to the center of the display screen.

It should be noted that the movement path calculation unit 152 may control a movement amount of the robot 30 with respect to an operation amount on the image by adjusting a gain applied to the vector as the movement path of the robot being obtained as described above.

When the visual sensor 70 is a three-dimensional sensor that can acquire three-dimensional positional information about a target object, three-dimensional path information for moving the robot 30 can be acquired from an operation on an image when image information acquired by the visual sensor 70 is displayed as the image on the display screen of the teach pendant 10. As an example, when the visual sensor 70 is a distance image camera that can acquire a distance image, depth information about a position designated on the distance image can be acquired, and thus a path in a workspace corresponding to a track designated on the image can be acquired by using the depth information. It should be noted that, when a distance image is displayed on the teach pendant 10 and robot control by a user operation on the image is achieved, robot control according to the user operations described as the first example to the fourth example can also be performed.

The motion control unit 151 of the robot controller 50 may make notification that the robot 30 is moving during the movement of the robot in terms of improving safety of robot control in the image operation mode. For example, the motion control unit 151 may perform, during movement of the robot 30, at least one or more of vibration of the teach pendant 10, output of a sound from the teach pendant 10 (or another device), and display for calling attention to a fact that the robot 30 is moving on the display screen of the teach pendant 10.

Further, a motion allowable range of the robot 30 may be set in the robot controller 50 so that the robot 30 does not interfere with an object in a workspace. In a case where the motion allowable range is set, the motion control unit 151 controls a stop of the robot 30 when, for example, the robot 30 is to exit from the motion allowable range.

An example in which a position of the teach pendant 10 is recognized by using a sensor for position detection and control is performed so as to prevent the robot 30 from entering within a predetermined radius from the position of the teach pendant 10 is also possible. As an example, a transmitter that outputs a signal (light, a radio wave (beacon)) within a predetermined distance range is provided in the teach pendant 10, and a receiver that receives the signal is provided in the robot 30. With a configuration for controlling the transmitter and the receiver from the robot controller 50, control so that the robot 30 does not enter within a predetermined radius (for example, within 1 m) from the teach pendant 10 can be achieved. Alternatively, as a usage example of a position sensor for recognizing a position of the teach pendant 10, an example of recognizing a position of the teach pendant 10 by disposing a camera in a workspace, an example of mounting a position sensor (an acceleration sensor and a gyro sensor) on the teach pendant 10, and the like are possible.

Figure 9:
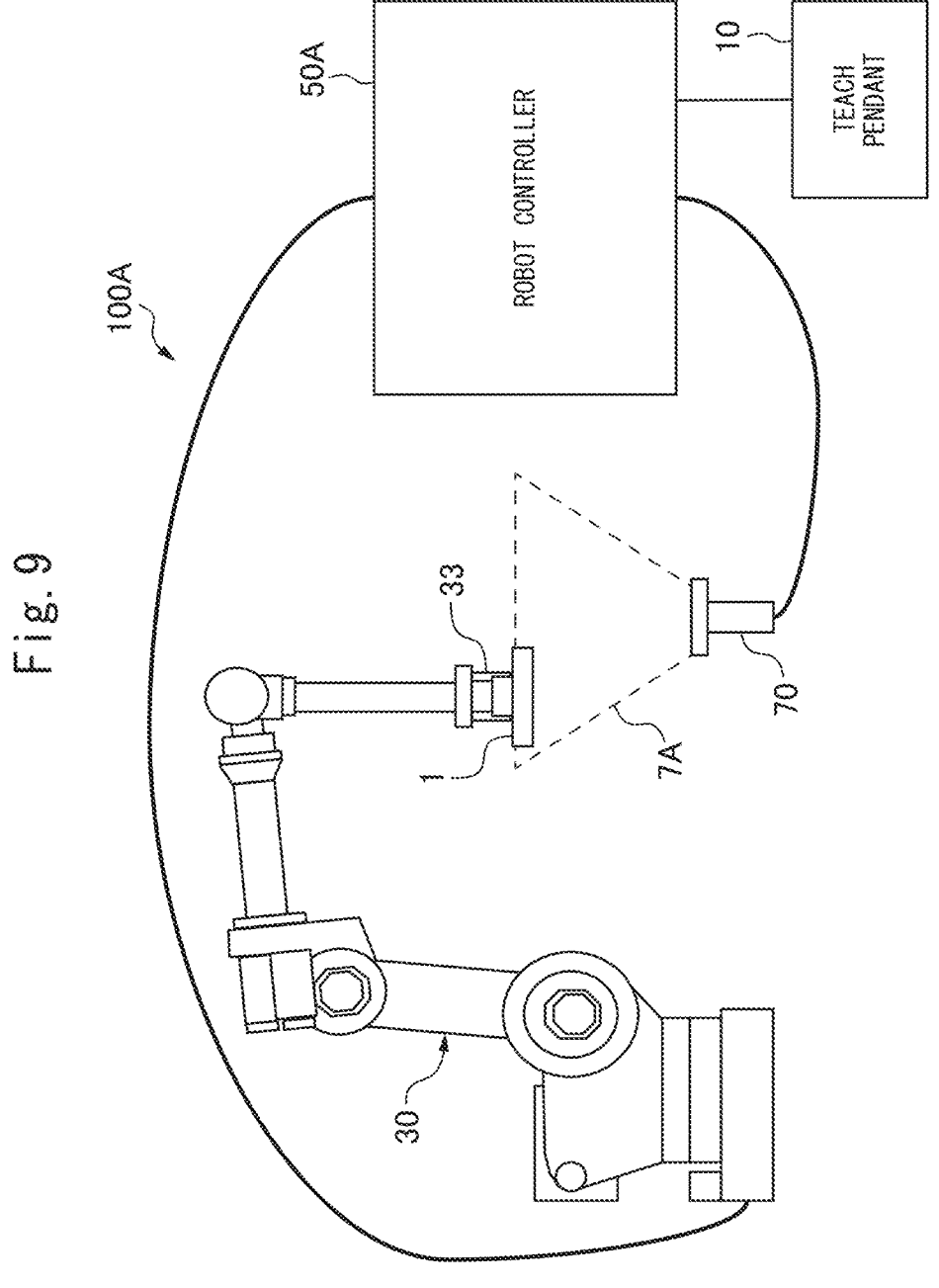
FIG. 9 is a diagram illustrating a configuration example of a robot system when a visual sensor is used as a fixed camera being fixed in a workspace.

FIG. 9 illustrates a configuration example of a robot system 100A when the visual sensor 70 is used as a fixed camera being fixed in a workspace. In the present example, the visual sensor 70 is disposed with a visual field 7A upward on an installation floor in the workspace. The robot 30 performs processing (such as detection and determination) on the workpiece 1 by grasping the workpiece 1 with the hand 33 and showing the workpiece 1 to the visual sensor 70.

In the robot system 100A, the teach pendant 10 has the same function as the teach pendant 10 illustrated in FIG. 3. Further, the robot controller 50A is assumed to have a function equivalent to the function of the robot controller 50 illustrated in FIG. 3 and also have a function as the visual sensor controller 20. Also, in the robot system 100A using the visual sensor 70 as the fixed camera in such a manner, a robot operation according to an operation on an image when the robot system 100 described above is used can be similarly achieved.

In a configuration of the robot system 100A, when an image displayed on the teach pendant 10 is operated, the robot 30 is controlled so that the workpiece 1 grasped by a tip of the robot 30 is moved in a direction parallel to a plane (an image capturing surface of an image pickup device) of the image. It should be noted that a movement direction of the robot 30 with respect to an operation direction on an image is opposite between the case where the visual sensor 70 is mounted on the robot 30 as in the robot system 100 and the case where the visual sensor 70 is fixedly installed as in the robot system 100A. It should be noted that, in the present example, in view of a fact that a subject of the visual sensor 70 is the workpiece 1, moving a position of the robot 30 with respect to the visual sensor 70 so that the workpiece 1 captured as an image on the display screen is moved in response to a user operation on the image is equivalent to moving, in response to a user operation on the image, a visual field of the visual sensor 70 captured as an image on the display screen.

According to the embodiments described above, an operation of a robot by an operation on an image can be achieved, and an intuitive operation of the robot can be achieved.

The present invention has been described above by using the typical embodiments, but it will be understood by those of ordinary skill in the art that changes, other various changes, omission, and addition may be made in each of the embodiments described above without departing from the scope of the present invention.

Various functions achieved by the robot controller and the teach pendant according to the embodiments described above can be applied to control devices of various industrial machines including control devices of machine tools.

An arrangement of the functional blocks in the functional block diagram illustrated in FIG. 3 is an example, and various configuration examples of an arrangement of the functional blocks are possible. For example, the movement path calculation unit 152 may be incorporated in the teach pendant.

The functional block achieved by the visual sensor controller, the robot controller, and the teach pendant illustrated in FIG. 3 may be achieved by executing various types of software stored in a storage device by the processor of these devices, or may be achieved by a configuration in which hardware such as an application specific integrated circuit (ASIC) is a main body.

The program for executing each function of the visual sensor controller, the robot controller, and the teach pendant in the embodiment described above can be recorded in various computer-readable recording media (for example, a ROM, an EEPROM, a semiconductor memory such as a flash memory, a magnetic recording medium, and an optical disk such as a CD-ROM and a DVD-ROM).

REFERENCE SIGNS LIST

1 Workpiece
2 Worktable
10 Teaching pendant
11 Processor
12 Memory
13 Display unit
13A to 13E Image
14 Operation unit
15 Input/output interface
20 Visual sensor controller
30 Robot
33 Hand
40 Control device
50, 50A Robot controller
51 Processor
52 Memory
53 Input/output interface
54 Operation unit
70 Visual sensor
100, 100A Robot system
111 Teaching unit
112 Image operation unit
121 Control unit
122 Storage unit
123 Image processing unit
151 Motion control unit
152 Movement path calculation unit

The invention claimed is:

1. A control device for controlling an industrial machine, the control device comprising:

an image operation unit configured to display an image captured by a visual sensor on a display screen, and also receive a user operation on the image; and a motion control unit configured to control motion of the industrial machine to move, in response to the user operation, a visual field of the visual sensor being captured as the image on the display screen, wherein the image operation unit is configured to receive, as the user operation on the image, an operation of tracing the display screen to obtain a track of the operation of tracing the display screen, and the motion control unit is configured to control the motion of the industrial machine to move the visual field of the visual sensor being captured as the image on the display screen to a direction corresponding to the track.

2. The control device according to claim 1, wherein the motion control unit includes a movement path calculation unit configured to calculate a movement path of the industrial machine according to the user operation.

3. The control device according to claim 2, wherein the image operation unit is configured to obtain the direction by approximating, by a straight line, the track on the display screen, and the movement path calculation unit is configured to calculate the movement path based on the obtained direction.

4. The control device according to claim 2, wherein the image operation unit is configured to obtain, based on the track on the display screen, a starting point and an end point indicating the track, and the movement path calculation unit is configured to calculate the movement path, based on the obtained starting point and end point.

5. The control device according to claim 4, wherein the image operation unit is configured to acquire the starting point and the end point at regular time intervals while the user operation is performed, and the movement path calculation unit is configured to determine, based on the starting point and the end point being acquired at the regular time intervals, the movement path to allow the visual field of the visual sensor to move along the operation of tracing the display screen.

6. The control device according to claim 2, wherein the movement path calculation unit is configured to determine, a movement amount of the industrial machine by multiplying, by a predetermined gain, a movement amount on the image indicated by the user operation.

7. The control device according to claim 2, wherein the image is a two-dimensional image, and the movement path calculation unit is configured to obtain the movement path by applying an operation for projecting, onto a predetermined plane in a workspace, a position on the image indicating the user operation.

8. The control device according to claim 1, wherein the visual sensor has a position fixed in a workspace, the industrial machine is configured to grasp, by using a grasping device, a target object to be captured by the visual sensor, and the motion control unit is configured to move the industrial machine to move, in response to the user operation, a position of the target object captured as the image on the display screen.

9. The control device according to claim 1, wherein the motion control unit is configured to make notification that the industrial machine is moving while the industrial machine is moved.

10. The control device according to claim 1, wherein the motion control unit is configured to control the industrial machine to perform motion within a preset motion allowable range.

* * * * *